US010298696B2

(12) United States Patent
Forsberg et al.

(10) Patent No.: US 10,298,696 B2
(45) Date of Patent: May 21, 2019

(54) METHODS AND APPARATUS FOR CONFIGURING AND IMPLEMENTING ANNOUNCEMENTS FOR IP MULTIMEDIA SUBSYSTEM SUPPLEMENTARY SERVICES (75) Inventors: Mikael Forsberg, Tyresö (SE); John Olsson, Saltsjö-Boo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 216 days.

(21) Appl. No.: 14/371,246

(22) PCT Filed: Jan. 13, 2012

(86) PCT No.: PCT/EP2012/050527
§ 371 (c)(1),
(2), (4) Date: Jul. 9, 2014

(87) PCT Pub. No.: WO2013/104429
PCT Pub. Date: Jul. 18, 2013

(65) Prior Publication Data
US 2015/0026243 A1   Jan. 22, 2015

(51) Int. Cl.
H04L 12/24 (2006.01)
H04L 29/06 (2006.01)
H04L 29/08 (2006.01)

(52) U.S. Cl.
CPC .......... H04L 67/16 (2013.01); H04L 41/0686 (2013.01); H04L 65/1006 (2013.01);
(Continued)

(58) Field of Classification Search
CPC ... H04L 41/0686; H04L 45/00; H04L 63/102; H04L 65/60; H04L 65/1006;
(Continued)

(56) References Cited

U.S. PATENT DOCUMENTS

2004/0190453 A1* 9/2004 Rasanen ............ H04L 12/5695
370/235
2007/0055783 A1* 3/2007 Gourraud ............ H04L 63/102
709/227

(Continued)

FOREIGN PATENT DOCUMENTS

EP        2 317 745 A1       5/2011
WO    WO 2008/041830 A1    4/2008
WO    WO 2010/105635 A1    9/2010

OTHER PUBLICATIONS

Camarillo, et al., RFC3960 Early Media and Ringing Tone Generation, Dec. 2004, IETF.*

(Continued)

Primary Examiner — Nicholas R Taylor
Assistant Examiner — Michael Li
(74) Attorney, Agent, or Firm — Sage Patent Group (57) ABSTRACT According to a first aspect of the present invention there is provided a method of operating an Application Server (AS) that implements an IP Multimedia Subsystem (IMS) supplementary service for a user. The method includes configuring a rule for the user, the rule having an action specifying whether or not an announcement is to be provided and, if an announcement is to be provided, defining media to be used for the announcement. The method further includes determining if a condition of the rule is met by a Session Initiation Protocol (SIP) message relating to the user and, if so, implementing an announcement in accordance with the action.

14 Claims, 7 Drawing Sheets (52) U.S. Cl.
CPC ...... *H04L 65/1016* (2013.01); *H04L 65/1063* (2013.01); *H04L 65/1069* (2013.01); *H04L 65/1096* (2013.01); *H04L 67/10* (2013.01); *H04L 67/42* (2013.01)

(58) Field of Classification Search
CPC ............. H04L 65/1016; H04L 65/1063; H04L 65/1069; H04L 65/1076; H04L 65/1083; H04L 65/1096; H04L 65/4007; H04L 65/4061; H04L 65/4076; H04L 65/4084; H04L 67/02; H04L 67/10; H04L 67/16; H04L 67/24; H04L 67/42; H04M 2203/205; H04M 2203/352; H04M 2203/2072; H04M 2207/20; H04M 3/02; H04M 3/46; H04M 3/54; H04M 3/428; H04M 3/436; H04M 3/487; H04M 3/527; H04M 3/537; H04M 3/4872; H04M 3/42017; H04M 3/42034; H04M 3/42042; H04M 3/42059; H04M 3/42093; H04M 3/42102; H04M 3/42365; H04M 7/006; H04W 4/00; H04W 4/02; H04W 4/16; H04W 12/06; H04W 28/06; H04W 36/385; H04W 74/00; H04W 76/10; H04W 76/45; H04W 80/00
See application file for complete search history.

(56) References Cited

U.S. PATENT DOCUMENTS

| | | | | |
|---|---|---|---|---|
| 2007/0140219 | A1* | 6/2007 | Diroo | H04M 3/42042 370/352 |
| 2008/0317023 | A1* | 12/2008 | Stuttgen | H04L 67/16 370/389 |
| 2009/0003380 | A1* | 1/2009 | Jackson | H04L 65/1069 370/466 |
| 2009/0019374 | A1* | 1/2009 | Logan | H04M 3/4872 715/753 |
| 2009/0144429 | A1* | 6/2009 | Astrom | H04L 65/40 709/227 |
| 2009/0202059 | A1* | 8/2009 | Sharma | H04M 3/02 379/201.01 |
| 2009/0268720 | A1* | 10/2009 | Veenstra | H04L 29/06319 370/352 |
| 2010/0017509 | A1* | 1/2010 | Frankkila | H04M 3/487 709/224 |
| 2010/0098231 | A1* | 4/2010 | Wohlert | H04M 3/436 379/207.15 |
| 2010/0157980 | A1* | 6/2010 | Ellsworth | H04M 3/42365 370/352 |
| 2010/0197323 | A1* | 8/2010 | Freeburg | H04W 4/02 455/456.2 |
| 2011/0134807 | A1 | 6/2011 | Tevonian | |
| 2011/0179181 | A1* | 7/2011 | Elz | H04L 65/1069 709/227 |
| 2012/0059913 | A1* | 3/2012 | Imbimbo | H04W 36/385 709/219 |

OTHER PUBLICATIONS

Camarillo, et al., RFC3959 The Early Session Disposition Type for the Session Initiation Protocol (SIP), Dec. 2004, IETF.*
International Search Report for PCT Application No. PCT/EP2012/050527 dated Oct. 10, 2012, 4 pages.
Written Opinion of the International Preliminary Examining Authority for PCT Application No. PCT/EP2012/050527 dated Oct. 10, 2012, 10 pages.
International Preliminary Report on Patentability for PCT Application No. PCT/EP2012/050527 dated Oct. 10, 2012, 22 pages.
"Functional model for customized multimedia ring service; Y.2214 (05/09)", ITU-T Standard, International Telecommunication Union, Geneva; CH, No. Y.2214 (05/09), May 22, 2009 (May 22, 2009), XP017467102; pp. 1-54.
Poikselka et al.: "IMS IP Multimedia Concepts and Services", Jan. 1, 2009, John Wiley & Sons, Chichester, GB, XP002676378, ISBN: 9780470721964; pp. 27-28.
3GPP TS 22.173 V11.3.0 (Sep. 2011) "3$^{rd}$ Generation Partnership Project; Technical Specification Group Services and System Aspects; IP Multimedia Core Network Subsystem (IMS) Multimedia Telephony Service and supplementary services;" Stage 1 (Release 11); 650 Route des Lucioles, Sophia Antipolis, Valbonne, France; 72 pages.
3GPP TS 24.173 V11.0.0 (Sep. 2011) "3$^{rd}$ Generation Partnership Project; Technical Specification Group Core Network and Terminals; (IMS) multimedia telephony communication service and supplementary services;" Stage 3 (Release 11); 650 Route des Lucioles, Sophia Antipolis, Valbonne, France; 17 pages.
3GPP TS 24.604 V11.0.0 (Sep. 2011) "3$^{rd}$ Generation Partnership Project; Technical Specification Group Core Network and Terminals; Communication Diversion (CDIV) using IP Multimedia (IM) Core Network (CN) subsystem; Protocol specification;" (Release 11); 650 Route des Lucioles, Sophia Antipolis, Valbonne, France; 67 pages.
3GPP TS 24.611 V11.0.0 (Sep. 2011) "3$^{rd}$ Generation Partnership Project; Technical Specification Group Core Network and Terminals; Anonymous Communication Rejection (ACR) and Communication Barring (CB) using IP Multimedia (IM) Core Network (CN) subsystem; Protocol specification;" (Release 11); 650 Route des Lucioles, Sophia Antipolis, Valbonne, France; 26 pages.
3GPP TS 24.623 V10.3.0 (Mar. 2012) "3$^{rd}$ Generation Partnership Project; Technical Specification Group Core Network and Terminals; Extensible Markup Language (XML) Configuration Access Protocol (XCAP) over the Ut interface for Manipulating Supplementary Services" (Release 10); 650 Route des Lucioles, Sophia Antipolis, Valbonne, France; 18 pages.
3GPP TS 24.628 V11.0.0 (Sep. 2011) "3$^{rd}$ Generation Partnership Project; Technical Specification Group Core Network and Terminals; Common Basic Communication procedures using IP Multimedia (IM) Core Network (CN) subsystem; Protocol specification" (Release 11); 650 Route des Lucioles, Sophia Antipolis, Valbonne, France; 57 pages.
First Office Action, (Chinese Patent Application No. 201280066885.4 filed Jan. 13, 2012) dated Sep. 5, 2016, 4 pages.
Article 94(3) Communication (EPO Patent Application No. 12 700 962.9 filed Jan. 13, 2012) dated Feb. 3, 2017, 9 pages.
Second Office Action, (Chinese Patent Application No. 201280066885.4 filed Jan. 13, 2012) dated Apr. 6, 2017, 7 pages.

* cited by examiner

METHODS AND APPARATUS FOR CONFIGURING AND IMPLEMENTING ANNOUNCEMENTS FOR IP MULTIMEDIA SUBSYSTEM SUPPLEMENTARY SERVICES

CROSS REFERENCE TO RELATED APPLICATION

This application is a 35 U.S.C. § 371 national stage application of PCT International Application No. PCT/EP2012/050527, filed on 13 Jan. 2012, the disclosure of which is incorporated by reference herein in its entirety. The above-referenced PCT International Application was published in the English language as International Publication No. WO 2013/104429 A1 on 18 Jul. 2013.

TECHNICAL FIELD

The present invention relates to methods and apparatus for configuring and implementing announcements for IP Multimedia Subsystem (IMS) supplementary services. More particularly, the invention relates to methods and apparatus for enabling an IP Multimedia Subsystem (IMS) user to flexibly configure any announcements associated with their supplementary services.

BACKGROUND

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Figure 1:
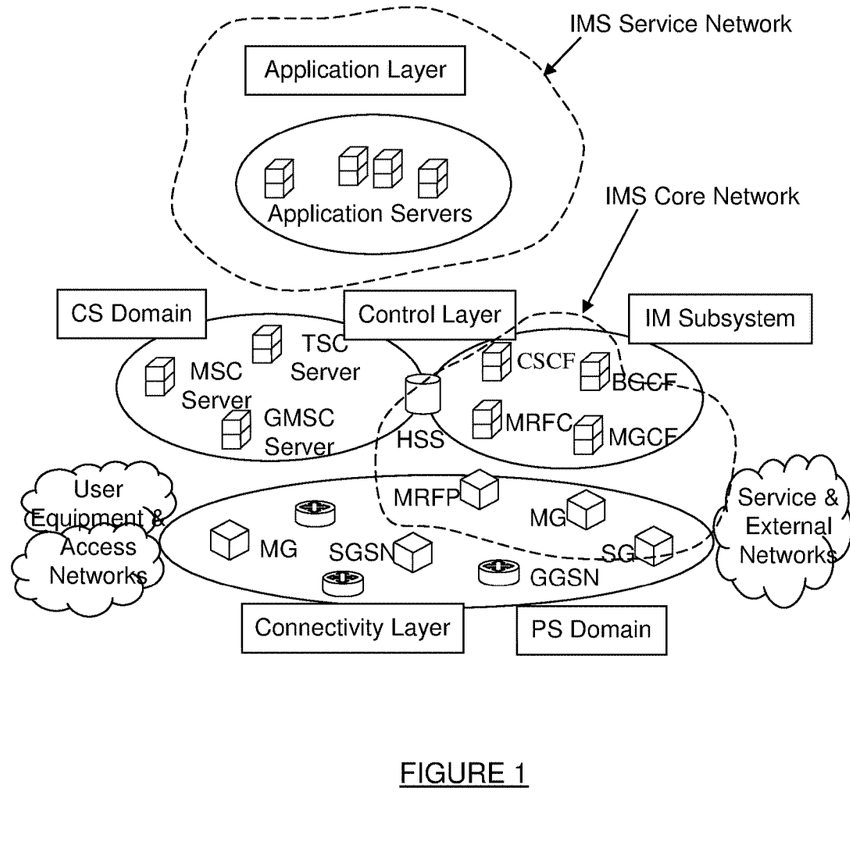
FIG. 1 schematically an IMS network in association with a mobile network architecture of a General Packet Radio Service (GPRS) access network.

FIG. 1 illustrates schematically how the IMS fits into the mobile network architecture in the case of a GPRS/PS access network (IMS can of course operate over other access networks). As shown in FIG. 1, the IMS includes a core network and a service network. Call/Session Control Functions (CSCFs) operate as SIP proxies within the IMS core network, and interface with other entities such as Border Gateway Control Functions (BGCFs) and Media Resource Function Controllers (MRFCs) amongst others. A Proxy CSCF (P-CSCF) is the first point of contact within the IMS for a SIP terminal; a Serving CSCF (S-CSCF) provides services to the subscriber; an Interrogating CSCF (I-CSCF) identifies the correct S-CSCF and forwards to that S-CSCF a request received from a SIP terminal via a P-CSCF.

Within the IMS service network, Application Servers (aSs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

3GPP TS 22.173 (V11.3.0) and 3GPP TS 24.173 (V11.0.0) define the supplementary services that are supported by IMS. For example, the standardized supplementary services supported by IMS include but are not limited to Originating Identification Presentation (OIP), Originating Identification Restriction (OIR), Terminating Identification Presentation (TIP), Terminating Identification Restriction (TIR), Communication Diversion (CDIV), Communication Hold (HOLD), Communication Barring (CB), Message Waiting Indication (MWI), Conference (CONF), Explicit Communication Transfer (ECT), Advice Of Charge (AOC), Communication Waiting (CW), Flexible Alerting (FA), Communication Waiting (CW), Customized Alerting Tones (CAT), and Customized Ringing Signal (CRS). In addition to the standardized supplementary services, the vendor of an IMS Application Server can configure an Application Server so as to implement additional, vendor specific services. An example of such a vendor specific service is the Flexible Communication Distribution service.

The Communications Diversion (CDIV) service, as defined in 3GPP TS 24.604 (V11.0.0), enables a user to divert/re-direct an incoming communication that fulfils certain provisioned or configured conditions to another destination. 3GPP TS 24.604 specifies that, when Communication Diversion occurs, the Application Server (AS) providing the CDIV supplementary service may initiate an announcement towards the calling user in order to inform the calling user about the diversion (see section 4.5.2.6.4). Similarly, 3GPP TS 24.611 (V11.0.0), which defines the Communication Barring (CB) service, also specifies that, when a communication is barred/rejected, the AS providing the CB supplementary service can provide an announcement to the originating user (see sections 4.5.2.4.1, 4.5.2.6.1, and 4.5.2.6.2). In addition, both 3GPP TS 24.604 and 3GPP TS 24.611 state that such an announcement may be played according to procedures as are described in 3GPP TS 24.628.

With regards to 3GPP TS 24.628 (V11.0.0), this document specifies the methods that can be used by a service in order to provide an announcement during the establishment of a communication and when a rejecting a communication request. For example, an AS can use early media, as defined by IETF RFC 3960, for sending the announcement in-band.

SUMMARY

It has been recognised here that whilst certain supplementary services can optionally implement announcements, none of the relevant standards specify how it can be determined that an announcement is to be played nor how the media to be used for an announcement is identified. In particular, the relevant standards do not provide any mechanisms that enable a user to flexibly configure the announcements associated with their supplementary services. It is therefore an object of the present invention to enable an IP Multimedia Subsystem (IMS) user to configure the announcements associated with their supplementary services, such as the Communications Diversion (CDIV) service and Communication Barring (CB) service.

According to a first aspect of the present invention there is provided a method of operating an Application Server (AS) that implements an IP Multimedia Subsystem (IMS) supplementary service for a user. The method comprises configuring a rule for the user, the rule having an action specifying whether or not an announcement is to be provided and, if an announcement is to be provided, defining media to be used for the announcement. The method further comprises determining if a condition of the rule is met by a Session Initiation Protocol (SIP) message relating to the user and, if so, implementing an announcement in accordance with the action.

The action may specify that an announcement is to be provided and include location information that can be used to locate the media that is to be used for the announcement. If the condition of such a rule is met by a SIP message, then the method may further comprise providing the location information to a Media Resource Function (MRF) that is to send the announcement to the user. The location information may be a Uniform Resource Locator of the media that is to be used for the announcement.

Alternatively, the action may specify that an announcement is to be provided and include the media that is to be used for the announcement. If the condition of such a rule is met by a SIP message, the method may further comprise providing the media to a Media Resource Function (MRF) that is to send the announcement to the user.

As a further alternative, the action may specify that an announcement is not to be provided.

The supplementary service implemented by the AS may be any rule based service. Examples of rule based services include a Communications Diversion (CDIV) service, a Communication Barring (CB) service, a Flexible Communication Distribution (FCD) service, and a Flexible Alerting (FA) service.

According to a second aspect of the present invention there is provided a method of operating an IP Multimedia Subsystem (IMS) Media Resource Function (MRF) to provide an announcement associated with a supplementary service. The method comprises receiving a message from an Application Server (AS) that implements the supplementary service, the message identifying a user to which the announcement should be sent and defining media to be used for the announcement. The method further comprises sending the media to the identified user.

The message received from the AS may include location information that can be used to locate the media that is to be used for the announcement. The method may then further comprise determining if the media is stored at the MRF and, if the media is located at the MRF, then sending the stored media to the identified user or, if the media is not located at the MRF, then retrieving the media from an external source and sending the retrieved media to the identified user. The location information may be a Uniform Resource Locator of the media that is to be used for the announcement.

Alternatively, the message received from the AS may include the media that is to be used for the announcement. The method may then further comprise sending the received media to the identified user According to a third aspect of the present invention there is provided a method of operating a user equipment (UE) to configure an IP Multimedia Subsystem (IMS) supplementary service for a user. The method comprises accepting input from the user, the input defining a rule for the user, the rule having an action specifying whether or not an announcement is to be provided and, if an announcement is to be provided, defining media to be used for the announcement. The method further comprises sending a message to an Application Server (AS) that implements the supplementary service, the message including the rule defined by the user input.

The action may specify that an announcement is to be provided and include location information that can be used to locate the media that is to be used for the announcement. The location information may be a Uniform Resource Locator of the media that is to be used for the announcement.

Alternatively, the action may specify that an announcement is to be provided and include the media that is to be used for the announcement. As a further alternative, the action may specify that an announcement is not to be provided.

According to a fourth aspect of the present invention there is provided an apparatus configured to operate as an Application Server (AS) that implements an IP Multimedia Subsystem (IMS) supplementary service for a user. The apparatus comprises a memory storing a rule for the user, the rule having an action specifying whether or not an announcement is to be provided and, if an announcement is to be provided, defining media to be used for the announcement. The apparatus further comprises a processor for determining if a condition of the rule is met by a Session Initiation Protocol, SIP, message relating to the user and, if so, implementing an announcement in accordance with the action.

The memory may store an action that specifies that an announcement is to be provided and that includes location information that can be used to locate the media that is to be used for the announcement. The processor may be configured to provide the location information to a Media Resource Function (MRF) that is to send the announcement to the user, if the condition of such a rule is met by a SIP message.

The memory may store an action that specifies that an announcement is to be provided and that includes the media that is to be used for the announcement. The processor may be configured to provide the media to a Media Resource Function (MRF) that is to send the announcement to the user, if the condition of such a rule is met by a SIP message.

The memory may store an action that specifies that an announcement is not to be provided. The processor may be configured to not implement an announcement, if the condition of such a rule is met by a SIP message.

According to a fifth aspect of the present invention there is provided an apparatus configured to operate as an IP Multimedia Subsystem (IMS) Media Resource Function (MRF) for providing an announcement associated with a supplementary service. The apparatus comprises a receiver for receiving a message from an Application Server (AS) that implements the supplementary service; the message identifying a user to which the announcement should be sent and defining media to be used for the announcement. The apparatus further comprises a processor for establishing a media session with the identified user, and a transmitter for sending the media to the identified user.

The receiver may be configured to receive a message from the AS that includes location information, and the processor may then be configured to use the location information to locate the media that is to be used for the announcement. The processor may therefore be configured to determine if the media is stored at the MRF and, if the media is located at the MRF, to implement sending of the stored media to the identified user or, if the media is not located at the MRF, then to implement retrieval of the media from an external source and sending of the retrieved media to the identified user.

The receiver may be configured to receive a message from the AS that includes the media that is to be used for the announcement, and the processor may then be configured to implement sending of the received media to the identified user.

According to a sixth aspect of the present invention there is provided an apparatus configured to operate as a user equipment (UE) for configuring an IP Multimedia Subsystem (IMS) supplementary service for a user. The apparatus comprises a user input device, a processor for accepting input from the user input device, the input defining a rule for the user, the rule having an action specifying whether or not an announcement is to be provided and, if an announcement is to be provided, defining media to be used for the announcement. The apparatus further comprises a transmitter for sending a message to an Application Server (AS) that implements the supplementary service, the message including the rule defined by the user input.

The processor may be configured to accept input of a rule having an action that specifies that an announcement is to be provided and that includes location information that can be used to locate the media that is to be used for the announcement. The processor may be configured to accept input of a rule having an action that specifies that an announcement is to be provided and that includes the media that is to be used for the announcement. The processor may be configured to accept input of a rule having an action that specifies that an announcement is not to be provided.

According to a further aspect of the present invention, there is also provided a computer program comprising computer readable code which, when run on an computer, causes the computer to perform a method according to any of the first, second or third aspects. In addition, there is provided a computer program product comprising a computer readable medium and a computer program according to the further aspect, wherein the computer program is stored on the computer readable medium.

DETAILED DESCRIPTION

There will now be described a method of enabling the configuration of announcements associated with the IP Multimedia Subsystem (IMS) supplementary services, such as the Communications Diversion (CDIV) service and Communication Barring (CB), of an IMS user. The method involves configuring an Application Server (AS) that implements a supplementary service with a rule for the user, the rule having an action specifying whether or not an announcement is to be played and, if an announcement is to be played, identifying/defining media to be used for the announcement. Subsequently, upon receipt of a SIP message relating to the user, the AS will determine if a condition of the rule is met by the SIP message and, if so, will implement an announcement in accordance with the action. In doing so, this method provides that announcements can be configured on a rule-by-rule and user-by-user basis, thereby providing that network operators and/or users can personalise/individualise the announcements that are played for each rule-based service.

To implement this method, the rule syntax as specified by IETF RFC 4745 would be extended to define additional actions that specify whether or not an announcement is to be played. As such, it is proposed herein that an additional action is defined that indicates that an announcement is to be played when the condition of the rule is matched by a SIP message. By way of example, this additional action could take the form:

```
<mmt-serv:play-URL-announcement>Announcement URL</mmt-serv:play-URL-announcement>
```

The action also identifies/defines the media to be used for the announcement by including a Uniform Resource Locator (URL) that identifies the media resource that is to be played as the announcement. This Announcement URL can be a HTTP, FTP or SFTP URL, or can be a URL defined in accordance with any other protocol that is able to specify the file (e.g. audio or video file) that is to be played as the announcement.

As an illustrative example, this additional action can then be used to define a Communication Barring rule that bars an incoming call from a user with the identity "sip:alice@example.com", and plays an announcement which is identified by the URL "file://my.announcements.org/alice.wav". Such a rule could take the form:

```
<ss:incoming-communication-barring active="true">
    <cp:ruleset>
        <cp:rule id="Personal operator hosted announcement">
            <cp:conditions>
                <cp:identity>
                    <cp:one id="sip:alice@example.com"/>
                </cp:identity>
            </cp:conditions>
            <cp:actions>
                <ss:allow>false</ss:allow>
                <mmt-serv:play-URL-announcement>file://my.announcements.org/alice.wav</mmt-serv:play-URL-announcement>
            </cp:actions
```

-continued

```
        </cp:rule>
      </cp:ruleset>
</ss:incoming-communication-barring>
```

Figure 2:
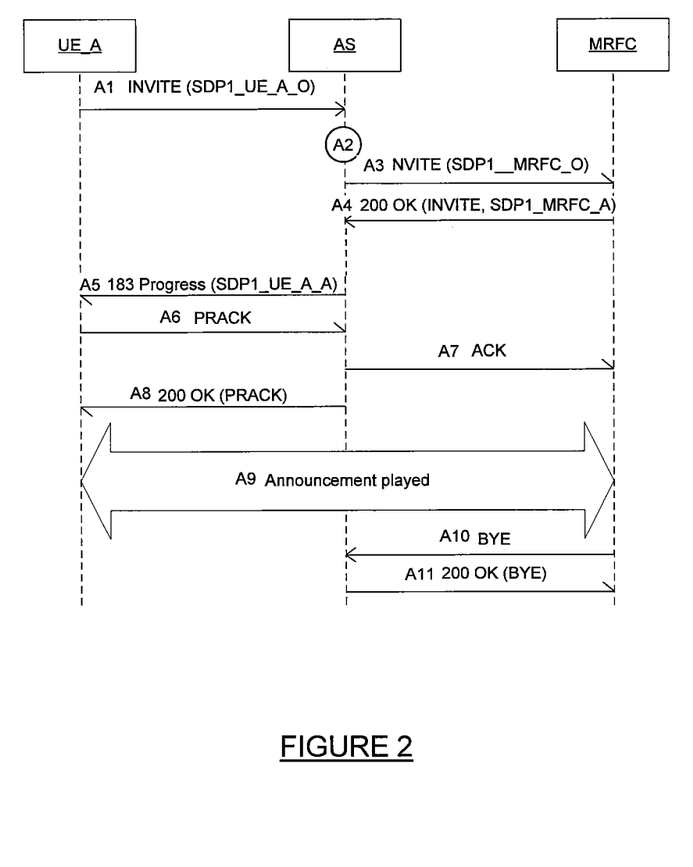
FIG. 2 is a signalling flow diagram illustrating an example of the process of an IP Multimedia Subsystem (IMS) supplementary service implementing an announcement in accordance with the methods described herein.

FIG. 2 is a signalling flow diagram illustrating an example of the process of an IP Multimedia Subsystem (IMS) supplementary service implementing an announcement in accordance with a rule configured as described above. In this example, the AS uses an early media session to send an in-band announcement and the media resource that is to be played as the announcement is located at an MRF. The steps performed are as follows:

A1. The UE of the originating user (i.e. UE A) initiates a communication by sending a SIP INVITE request message towards a terminating user. The INVITE request includes a Session Description Protocol (SDP) offer describing the media that the originating user wishes to use, as well as the IP addresses and ports to be used etc. An S-CSCF serving the terminating user receives the INVITE request and evaluates the Initial Filter Criteria associated with the terminating user. As a result of evaluating the Initial Filter Criteria, the S-CSCF sends the INVITE request to an AS implementing a supplementary service for the terminating user. For example, the terminating user may subscribe to a Communication Barring service such that the INVITE request is sent to an AS implementing this service.

A2. The AS implements the service logic for the terminating user. To do so, the AS will evaluate the service rules that have been configured for the terminating user against the SIP message. In this example, a rule is configured for the user whose condition is matched by the SIP message, and the corresponding action indicates that an announcement is to be played and includes a URL that identifies the media resource that is to be played as the announcement.

A3. The AS interacts with a Media Resource Function (MRF) that provides a Media Resource Function Controller (MRFC) and a Media Resource Function Processor (MRFP) to reserve the resources that are to be used the announcement. To do so, the AS sends an INVITE request to the MRFC including the SDP offer received from the originating user. The Request URI of the INVITE request specifies the announcement service through the use of the user part of the address (i.e. "annc") and additional URI parameters. These additional URI parameters include the "play" parameter which specifies the resource that is to be played as the announcement. In this example, the "play" parameter includes the URL that is specified in the action part of the rule.

A4. The MRFC responds to the INVITE request with a SIP 200 OK message including a SDP answer describing the media that the MRFC will accept, as well as the IP addresses and ports to be used etc.

A5. The AS then sends a SIP 183 (Session progress) response message to UE A including an answer to the SDP received in the INVITE request.

A6. The UE A responds to the SIP 183 (Session progress) response message with a PRACK request message.

A7. Upon receipt of the PRACK request, the AS then sends an ACK response message to the MRFC.

A8. The AS also sends a 200 (OK) response to the PRACK request to the originating user.

A9. The MRFC interacts with the MRFP in order to start the announcement and the MRFP sends the announcement towards the UE.

A10. The MRFC sends a BYE message to the AS.

A11. The AS response to the BYE message from the MRFC with a SIP 200 OK message.

In the example of FIG. 2, the media resource that is to be played as the announcement is identified by a URL and is located at the MRF such that the MRFC/MRFP recognises the URL as a local resource and sends the locally hosted media as the announcement. Alternatively, if the MRFC/MRFP does not recognise the URL as a local resource, then the MRFC/MRFP will retrieve the file that is to be played as the announcement according to the protocol defined by the URL. This alternative is illustrated in FIG. 3 in which the steps performed are the same as those of FIG. 2 with the exception that, after the MRFC/MRFP has received the INVITE from the AS, the MRFC/MRFP retrieves the media from some external media source identified using the URL that was included in the INVITE request received from the AS (see steps B3a and B3b).

Figure 3:
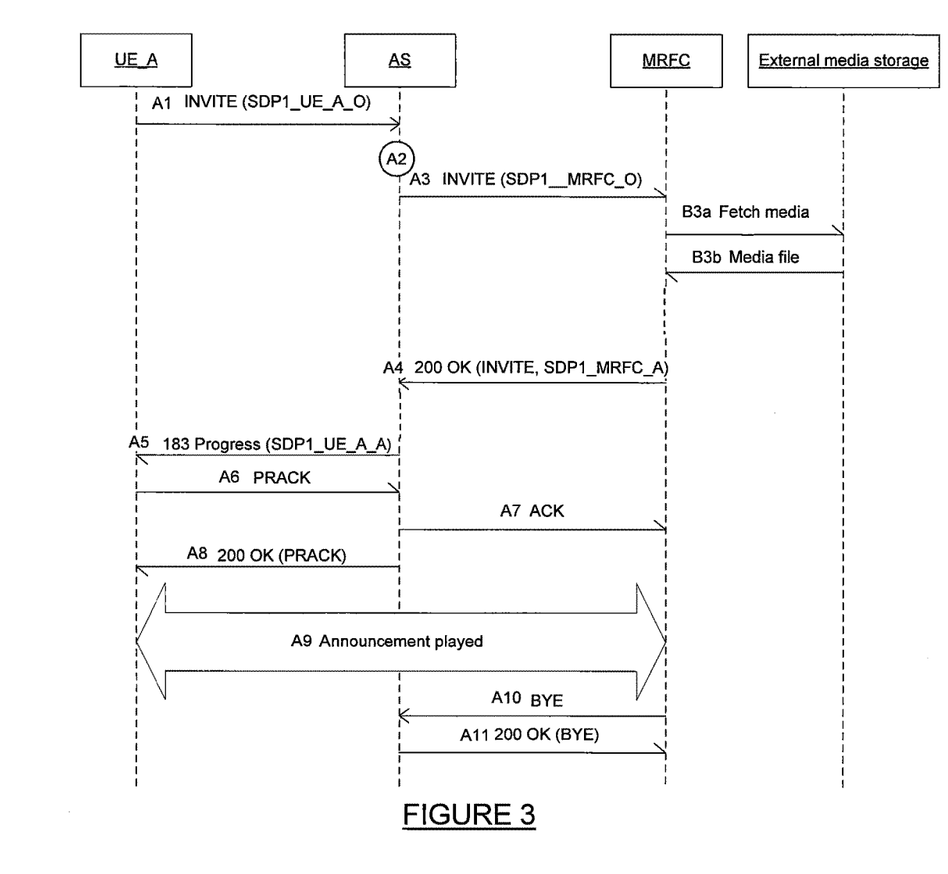
FIG. 3 is a signalling flow diagram illustrating an example of the process of an IP Multimedia Subsystem (IMS) supplementary service implementing an announcement in accordance with the methods described herein.
Figure 4:
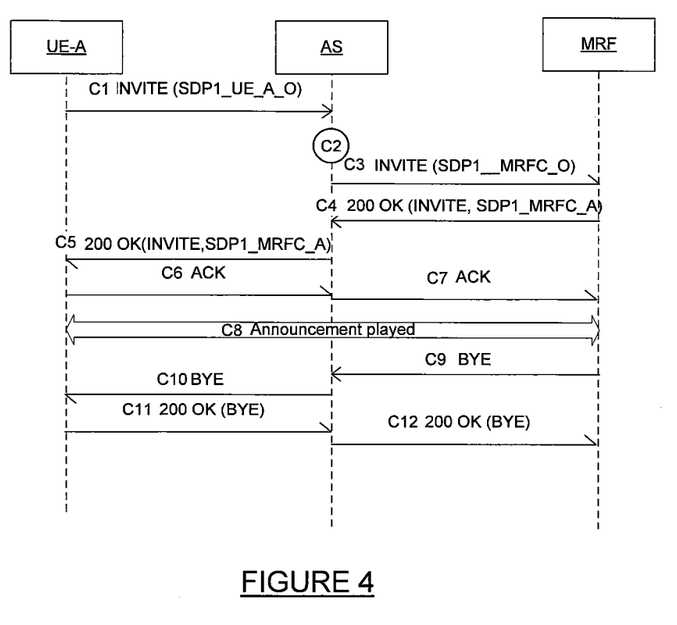
FIG. 4 is a signalling flow diagram illustrating an example of the process of an IP Multimedia Subsystem (IMS) supplementary service implementing an announcement in accordance with the methods described herein.

In the examples of FIGS. 2 and 3, an AS provides an announcement during the establishment of a communication session, and therefore implements an in-band announcement using an early media session; however, depending upon the type of rule that triggers the playing of an announcement, the AS could also be configured to provide an announcement during an already established communication session. For example, announcements triggered by Outgoing Communication Barring (OCB) and Supplementary Service Code (SSC) rules can require an announcement be provided during an established communication session. FIG. 4 is a signalling flow diagram illustrating an example of the process of an IP Multimedia Subsystem (IMS) supplementary service implementing an announcement in accordance with a rule configured as described above, wherein the announcement is provided during an established communication session. The steps performed are as follows:

C1. The UE of the originating user (i.e. UE A) initiates a communication by sending a SIP INVITE request message towards a terminating user. The INVITE request includes a Session Description Protocol (SDP) offer describing the media that the originating user wishes to use, as well as the IP addresses and ports to be used etc. An S-CSCF serving the originating user receives the INVITE request and evaluates the Initial Filter Criteria associated with the terminating user. As a result of evaluating the Initial Filter Criteria, the S-CSCF sends the INVITE request to an AS implementing a supplementary service for the originating user. For example, the originating user may subscribe to a Communication Barring service such that the INVITE request is sent to an AS implementing this service.

C2. The AS implements the service logic for the terminating user. To do so, the AS will evaluate the service rules that have been configured for the originating user against the SIP message. In this example, a rule is configured for the user whose condition is matched by the SIP message, and the corresponding action indicates that an announcement is to be played and includes a URL that identifies the media resource that is to be played as the announcement. For example, the Request-URI of the INVITE may be barred in accordance with an OCB rule or an SSC command may be executed.

C3. The AS interacts with a Media Resource Function (MRF) that provides a Media Resource Function Controller (MRFC) and a Media Resource Function Processor (MRFP) to reserve the resources that are to be used the announcement. To do so, the AS sends an INVITE request to the MRFC including the SDP offer received from the originating user. The Request URI of the INVITE request specifies the announcement service through the use of the user part of the address (i.e. "annc") and additional URI parameters. These additional URI parameters include the "play" parameter which specifies the resource that is to be played as the announcement. In this example, the "play" parameter includes the URL that is specified in the action part of the rule.

C4. The MRFC responds to the INVITE request with a SIP 200 OK message including a SDP answer describing the media that the MRFC will accept, as well as the IP addresses and ports to be used etc.

C5. The AS then forwards the SIP 200 OK to UE A.

C6. The UE A responds to the SIP 200 OK message with a ACK request message.

C7. Upon receipt of the ACK request, the AS forwards the ACK response message to the MRFC.

C8. The MRFC interacts with the MRFP in order to start the announcement and the MRFP sends the announcement towards the UE.

C9. After the announcement has been played, the MRFC sends a BYE to the AS.

C10. The AS forwards the BYE to UE A.

C11. UE-A response to the BYE with a SIP 200 OK message.

C12. The AS forwards the SIP 200 OK message to the MRFC.

It is also proposed herein that a further additional action is defined that indicates that an announcement is to be played when the condition of the rule is matched by a SIP message, and also defines the media to be user for the announcement by including the media to be played as the announcement within the action itself (i.e. as "announcement data"). By way of example, this further additional action could take the form:

```
<mmt-serv:play-binary-announcement
file_type="FileType">Announcement
data</mmt-serv:play-binary-announcement>
```

In this example, the action includes the binary data (i.e. content) of the relevant media and also defines the file type (.e.g .wav, .mp3 etc) of the announcement data (i.e. where file_type="FileType"). When implementing such an action, the AS implementing the supplementary service provides the announcement data to the MRFC/MRFP that is to send the announcement towards the UE.

As an illustrative example, this additional action can then be used to define a Commmunication Barring rule that bars an incoming call from a user with the identity "sip: alice@example.com" and plays an announcement to the user. Such a rule could take the form:

```
<ss:incoming-communication-barring active="true">
  <cp:ruleset>
    <cp:rule id="Personal non operator hosted announcement">
      <cp:conditions>
        <cp:identity>
          <cp:one id="sip:alice@example.com"/>
        </cp:identity>
      </cp:conditions>
      <cp:actions>
```

-continued

```
        <ss:allow>false</ss:allow>
        <mmt-serv:play-binary-announcement
          file_type="FileType">Announcement data</mmt-
          serv:play-binary-announcement>
      </cp:actions>
    </cp:rule>
  </cp:ruleset>
</ss:incoming-communication-barring>
```

Including the media that is to be used for an announcement in the action itself is likely to cause the rule to be relatively large in size, and would therefore use a relatively large amount of the memory available in both the Home Subscriber Server (HSS) that stores the user's profile (including the user's service rules) and the AS that will host the rules when providing the service to the user.

The media to be used for an announcement (i.e. hosted at an MRFC/MRFP, at an external media source, or at the AS providing the supplementary service) could be uploaded by the user, recorded by another service or selected from a selection of announcements that the service provider provides for its users. In order to allow a user to configure the announcements associated with a supplementary service, the service provider can provide a web portal or a mobile application via which the user can record there own announcement and/or choose from the announcements provided by the service provider. When choosing from the announcements provided by the service provider, a web portal or a mobile application would allow the user to browse and select an announcement (e.g. point-and-click) thereby avoiding the need for the user to type long paths into the action part of the rule as doing so would be error prone.

It is also proposed herein that a yet further additional action is defined that indicates that an announcement is not to be played when the condition of the rule is matched by a SIP message. By way of example, this further additional action could take the form:

<mmt-serv:play-no-announcement/>

Such an action is useful when a user explicitly does not want an announcement to be played. For example, an AS implementing a supplementary service could otherwise be configured to play a network-defined announcement if no specific announcement is defined within the action part of a rule.

The actions described above can be included within the rules defined for a supplementary service, thereby enabling the AS implementing a supplementary service to determine when an announcement is to be played and to identify the media that is to be used for an announcement on a user-by-user, rule-by-rule basis. In addition, by making use of the "media" condition within the rules defined for an individual supplementary service, different rules specifying different announcements within their actions can be used to implement different/alternative announcements depending upon the available media indicated in the SDP offer received in an incoming INVITE request. For example, the "media" condition can be used to specify a rule that requires a video announcement to be played if video media is available, and a further rule that requires that an audio announcement is to be played if only audio media is available.

Figure 5:
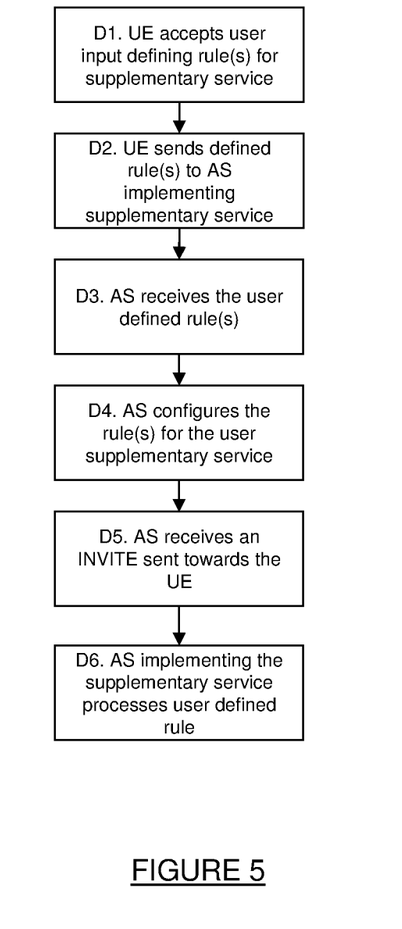
FIG. 5 is a flow diagram illustrating an example of the process of configuring and implementing an IP Multimedia Subsystem (IMS) supplementary service in accordance with the methods described herein.

FIG. 5 is a flow diagram illustrating an example of the process of the user configuration and implementation an IP Multimedia Subsystem (IMS) supplementary service in accordance with the methods described herein. The steps performed are as follows:

D1. A user who wants to configure a supplementary service to which they have subscribed makes use of their UE to input the rules that are to be applied by the supplementary service. At least one of these rules includes an action that indicates whether or not an announcement is to be played when the condition of the rule is matched by a SIP message. For example, if the supplementary service is a CDIV service, the user could configure a rule whose action requires any incoming communications be forwarded to another UE and requires that an audio recording is played to the originator of any diverted incoming communication.

D2. The UE then sends a message to an AS that implements the supplementary service, the message including the rule defined by the user input. As specified in 3GPP TS 24.623, this configuration of supplementary services by the user could take place over the Ut interface using XCAP as the enabling protocol, or could use SIP based user configuration.

D3. The AS that implements the supplementary service receives the message, including the user defined rule(s), from the UE.

D4. Using the rule definition information received in the message from the UE, the AS configures the supplementary service rules that are to be applied for the user.

D5. Subsequently, an originating user sends an INVITE request towards the user's UE. Based on the Initial Filter Criteria (IFC), indicating that the user is subscribed to the supplementary service, the INVITE request is forwarded to the AS that implements the supplementary service.

D6. Upon receipt of the INVITE request at the AS, the AS processes the rules that have been configured for the user to determine if an action supported by the supplementary service and associated with the rule should be performed in relation to the INVITE request. For example, if the AS is configured to implement the CDIV service, then the AS can use the rule to determine whether or not to re-direct the INVITE request to an identified target, and whether or not to implement an announcement to the originating user.

In order to implement the methods described herein, both the User Equipment (UE) and the Application Servers (AS) that implements the supplementary service would be arranged/configured so as to allow a user to configure one or more rules whose action defines if and how an announcement is to be implemented when the condition(s) of the rule are matched by a SIP message.

Figure 6:
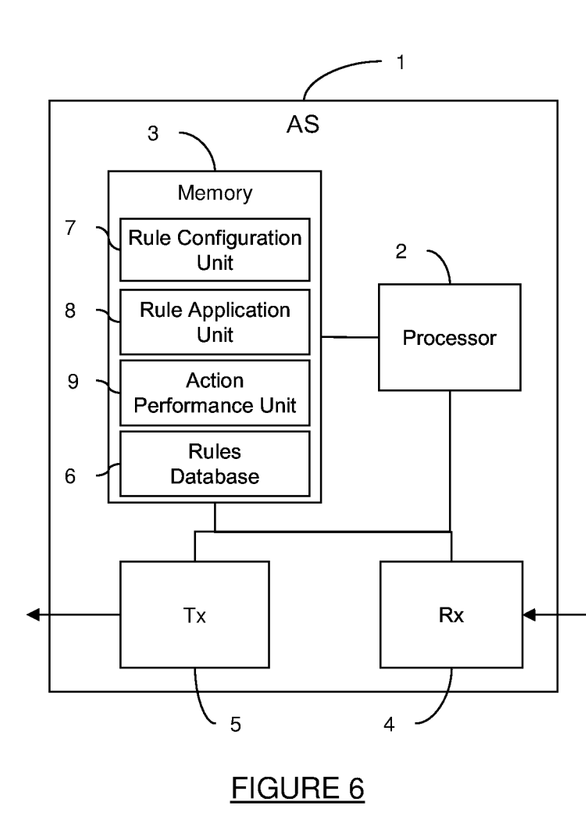
FIG. 6 illustrates schematically an example of an Application Server suitable for implementing the methods described herein.

FIG. 6 illustrates schematically an example of an AS 1 for implementing an IMS supplementary service in accordance with the methods described above. The AS 1 can be implemented as a combination of computer hardware and software. The AS 1 comprises a processor 2, a memory 3, a receiver 4 and a transmitter 5. The memory 3 stores the various programs/executable files that are implemented by the processor 2, and also provides a storage unit for any required data. For example, this data can include but is not limited to a rules database 8 that stores the rules configured for the users who have subscribed to the supplementary service. This data can also include announcement media data that can be used as announcements and included in a message sent to a MRF. The programs/executable files stored in the memory 3, and implemented by the processor 2, include but are not limited to a rule configuration unit 7, a rule application unit/condition assessment unit 8, and an action performance unit 9. The rule configuration unit 7 can process rule configuration information received from a user in order to configure the rules for the supplementary service that are to be applied for the user. This configuration of a rule would include storing the rule for the user in the rules database 8 provided by the memory 3. When the AS receives a communication relating to the user, using the receiver 4, the rule application unit/condition assessment unit 8 can then access rules database 8 provided by the memory 3 and retrieve the user's rules for the supplementary service. The rule application unit/condition assessment unit 8 can then determine if the condition defined in the rule is met by the communication and thereby determine if an action associated with the rule should be performed in relation to the communication. If it is determined that the action should be performed, then the action performance unit 9 can implement the action defined in the rule for that communication, which can include communicating with an MRFC/MRFP, using the receiver 4 and the transmitter 5, in order to implement an announcement if the action specifies that an announcement is required.

Figure 7:
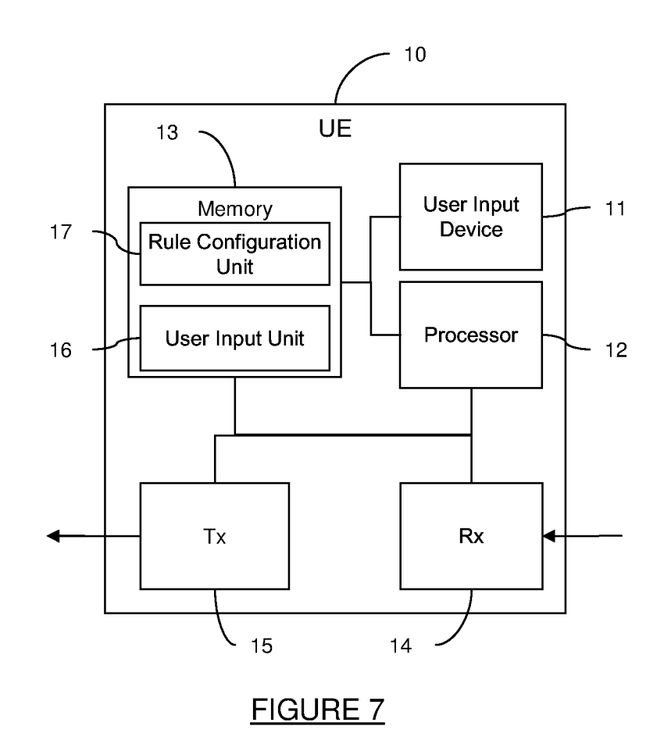
FIG. 7 illustrates schematically an example of a User Equipment suitable for implementing the methods described herein.

FIG. 7 illustrates schematically an example of a UE 10 suitable for implementing the methods described above. The UE 10 can be implemented as a combination of computer hardware and software. The UE 10 comprises a user input device 11, processor 12, a memory 13, a receiver 14 and a transmitter 15. The memory 13 stores the various programs/executable files that are implemented by the processor 12, and also provides a storage unit for any required data. The programs/executable files stored in the memory 13, and implemented by the processor 12, include but are not limited to a user input unit 16, and a rule configuration unit 17. The user input unit 16 can process any user input received from the user input device 11. For example, the user input unit 16 can accept input from the user input device 11 that defines a rule for the user that is to be applied by a supplementary service in accordance with the above-described methods. The user input unit 16 would then provide any user input relating to rule definition/configuration information to the rule configuration unit 17 to allow the user to define such a rule. The rule configuration unit 17 would then ensure that a message is sent to an Application Server (AS) that implements the supplementary service, the message including the rule definition/configuration information defined by the user input.

Figure 8:
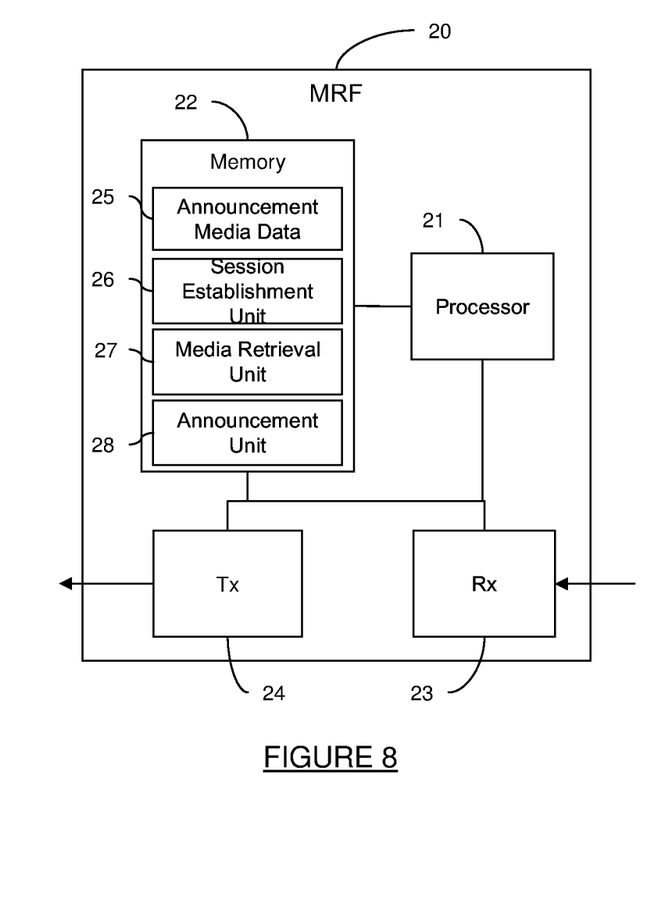
FIG. 8 illustrates schematically an example of a Media Resource Function suitable for implementing the methods described herein.

FIG. 8 illustrates schematically an example of an MRF 20 for implementing an announcement in accordance with the methods described above. The MRF 20 can be implemented as a combination of computer hardware and software. The MRF 20 comprises a processor 21, a memory 22, a receiver 23 and a transmitter 24. The memory 22 stores the various programs/executable files that are implemented by the processor 21, and also provides a storage unit for any required data. For example, this data can include but is not limited to announcement media data 25 that can be played as announcements if identified in a message received from an AS. The programs/executable files stored in the memory 22, and implemented by the processor 21, include but are not limited to a session establishment unit 26, a media retrieval unit 27 and an announcement unit 28. When the MRF 20 receives, using the receiver 23, a message from an AS that implements a supplementary service, the session establishment unit 26 ensures that a media session is established with a UE identified in the message, and the media retrieval unit 27 retrieves the media defined in the message that is to be sent to the UE over the established media session. For example, the media retrieval unit 27 can retrieve the media that is to be used for the announcement from the announcement media data 25 stored in the memory 22. Alternatively, the media retrieval unit 27 can use the receiver 23 and the transmitter 24 to implement retrieval of the media from an external source. As a further alternative, the media retrieval unit 27 could retrieve the media from with the message received from the AS. Once the media has been retrieved, the announcement unit 28 can then use the transmitter to send the media to the identified UE as an announcement.

The methods and apparatus described above provide mechanisms that enable the flexible configuration of the announcements associated with a user's supplementary services. In particular, the methods and apparatus described above provide that announcements can be configured on a rule-by-rule and user-by-user basis, thereby providing that network operators and/or users can personalise/individualise the announcements that are played for each rule-based service.

It will be appreciated by the person of skill in the art that various modifications may be made to the above-described embodiments without departing from the scope of the present invention. For example, whilst the above described embodiments specifically refer to the CDIV and CB services, these methods and apparatus can be equally applied to any rule-based service. In addition, the above described embodiments make use of an external MRF, but are equally applicable when the AS has an internal MRFC and accesses an MRFP directly via the Mp protocol (H.248).

The invention claimed is:

1. A method of operating an Application Server (VS) that implements an IP Multimedia Subsystem (IMS) supplementary service for a user, the method comprising:
   configuring a communication barring rule for the user, the communication barring rule comprising an action specifying that a user-configurable announcement is to be provided;
   sending, by the AS, an early media session to send the user-configurable announcement as an in-band announcement;
   configuring the user-configurable announcement to include media recorded by the user to be used for the user-configurable announcement;
   configuring a media type rule for the communication barring rule, the media type rule defining that a media type of the user-configurable announcement to be provided depends upon an indication of available media within an incoming Session Initiation Protocol (SIP) request message directed towards the user;
   determining if a condition of the communication barring rule is met by the incoming SIP request message directed towards the user;
   based on the condition of the communication barring rule being met by the SIP request message, providing, by the AS, location information to a Media Resource Function (MRF) that is to send the user-configurable announcement to the user, wherein the location information is location information of the media recorded by the user that meets the media type rule to be used for the user-configurable announcement; and
   implementing the user-configurable announcement in accordance with the action and the media type rule, in response to the determining the condition of the rule is met by the SIP message,
   wherein the user-configurable announcement is sent as the in-band announcement during establishment of a communication session between the AS and an originating user of the incoming SIP request message, and
   wherein the action includes the location information comprising a uniform resource locator that is used to locate the media that meets the media type rule recorded by the user at an external media source.

2. The method as claimed in claim 1, wherein the action includes the location information that can be used to locate the media that meets the media type rule recorded by the user that is to be used for the user-configurable announcement.

3. The method as claimed in claim 1, wherein the media recorded by the user to be used for the announcement comprises media recorded by the user via a web portal or a mobile application, the media recorded by the user being stored at an external media source.

4. An apparatus configured to operate as an Application Server (AS) that implements an IP Multimedia Subsystem (IMS) supplementary service for a first user, the apparatus comprising:
   a memory configured to store:
      a communication barring rule for the user, the communication barring rule comprising an action specifying a user-configurable announcement is to be provided the action defining media recorded by the user to be used for the announcement;
      a media type rule for the communication barring rule, the media type rule defining that a media type of the user-configurable announcement to be provided depends upon an indication of available media within an incoming Session Initiation Protocol (SIP) request message directed towards the user; and
   a processor configured to perform operations comprising:
      sending, by the AS, an early media session to send the user-configurable announcement as an in-band announcement;
      determining if a condition of the communication barring rule is met by the SIP request message directed towards the user;
      based on the condition of the communication barring rule being met by the SIP request message, providing, by the AS, location information to a Media Resource Function (MRF) that is to send the user-configurable announcement to the user, wherein the location information is location information of the media that meets the media type rule recorded by the user to be used for the user-configurable announcement; and
      implementing the user-configurable announcement in accordance with the action, in response to the determining the condition of the communication barring rule is met by the SIP request message,
      wherein the user-configurable announcement is sent as the in-band announcement during establishment of a communication session between the AS and an originating user of the incoming SIP request message, and
      wherein the action includes the location information comprising a uniform resource locator that is used to locate the media that meets the media type rule recorded by the user at the external media source.

5. The apparatus as claimed in claim 4, wherein the action includes the location information that can be used to locate the media that meets the media type rule recorded by the user that is to be used for the user-configurable announcement.

6. The apparatus as claimed in claim 4, wherein the media recorded by the user to be used for the announcement comprises media recorded by the user via a web portal or a mobile application, the media recorded by the user being stored at an external media source.

7. The method as claimed in claim 1, wherein configuring the user-configurable announcement comprises receiving an input from the user specifying the media recorded by the user to be used for the user-configurable announcement.

8. The apparatus as claimed in claim 4, wherein the processor is further configured to perform operations comprising configuring the user-configurable announcement based on an input received from the user specifying the media recorded by the user to be used for the user-configurable announcement.

9. A method of operating an Application Server (AS) that implements an IP Multimedia Subsystem (IMS) supplementary service for a user, the method comprising:
   configuring a communication barring rule for the user, the communication barring rule comprising an action specifying a user-configurable announcement is to be provided;
   configuring a media type rule for the communication barring rule, the media type rule defining that a media type of the user-configurable announcement to be provided depends upon an indication of available media within an incoming Session Initiation Protocol (SIP) request message directed towards the user;
   configuring the user-configurable announcement for the user including defining media that meets the media type rule recorded by the user to be used for the user-configurable announcement, wherein the action includes location information that is used to locate the media that meets the media type rule provided by the user that is to be used for the user-configurable announcement;
   determining a condition for the communication barring rule is met by a Session Initiation Protocol (SIP) request message directed towards the user;
   responsive to determining that the condition for the communication barring rule is met by the SIP request message relating to the user, providing the user-configurable announcement to an originating user of the SIP request message in accordance with the action; and
   responsive to the condition of the communication barring rule being met by the SIP request message directed towards the user,
   sending, by the AS, the location information to a Media Resource Function (MRF) that is to send the user-configurable announcement to the user,
   wherein the location information comprises a uniform resource locator that is used to locate the media that meets the media type rule recorded by the user at the external media source.

10. The method as claimed in claim 9, wherein the media recorded by the user to be used for the user-configurable announcement comprises media recorded by the user via a web portal or mobile application, the media recorded by the user being stored at an external media source.

11. The method as claimed in claim 9, further comprising:
    configuring another communicating barring rule that comprises an additional action that specifies that an announcement is not to be provided.

12. The method as claimed in claim 1, wherein the rule comprises an additional action that bars delivery of the incoming SIP request message to the originating user and announcement data defining the media recorded by the user to be used for the user-configured announcement.

13. The method as claimed in claim 12, wherein the announcement data comprises a file type of the announcement data.

14. The method as claimed in claim 12, wherein the additional action bars an incoming call request of the incoming SIP request message.

* * * * *